March 16, 1971      F. A. BEAKE      3,570,332

METHOD OF MACHINING SUPER-TOUGH METALS

Filed Dec. 18, 1967

INVENTOR

FREDERICK A. BEAKE

BY

ATTORNEY

United States Patent Office 3,570,332
Patented Mar. 16, 1971

3,570,332
METHOD OF MACHINING SUPER-TOUGH METALS
Frederick A. Beake, Hollis, N.H., assignor to Sanders Nuclear Corporation, Nashua, N.H.
Filed Dec. 18, 1967, Ser. No. 691,494
Int. Cl. B23b 1/00
U.S. Cl. 82—1
18 Claims

ABSTRACT OF THE DISCLOSURE

The invention disclosed herein relates to metal working processes and more particularly to a new and novel method and apparatus for the machining of super alloys and refractory metals wherein frictional heat is removed from the work and tool utilizing the latent heat of vaporization characteristic of a volatile coolant applied to the area of contact between the work and tool.

BACKGROUND OF THE INVENTION

Field of the invention

The present invention pertains to a new method and apparatus for machining super-tough metals which heretofore were considered either extremely difficult or even impossible to machine with conventional machine tools. The invention in effect provides an open cycle refrigeration action whereby frictional heat is removed from the work and tool thus resulting in a significant reduction in the time and expense of machining such super-tough materials as the super alloys and refractory metals.

DESCRIPTION OF THE PRIOR ART

Prior to the present invention the machining of super-tough metals such as the very hard modern cobalt, nickel and iron based super alloys, characteristically gummy materials such as lead, pyrophoric materials such as uranium and the refractory metals such as tungsten, molybdenum, rhenium and tantalum, was an extremely difficult task requiring the use of specialized tools and cutting techniques. Even with the expensive special equipment many purveyors of machining services have flatly refused to undertake the working of super-tough metals.

The most common technique used to work the super-tough metals has been grinding. This process is in many cases prohibitively expensive due to the inordinate amount of time required to remove a given amount of material from the work and the relative toughness of the work and grinding tool which results in very high tool wear. The grinding process is further limited to relatively simple shapes and the complex compound shapes such as rocket motor nozzles have simply not been available.

Electro-chemical etching and spark discharge machining are the prior art alternatives to grinding. All of these processes are not only expensive, in requiring highly complex and specialized equipment but are also extremely time consuming. For example, the time required to simply cut a 1 inch diameter super alloy rod is approximately 18 to 24 hours for electro-chemical etching and 12 to 16 hours for spark discharge machining. These processes are further limited to accuracies on the order of 5 mils, and cannot be used to machine complex shapes.

Cutting oils of different types including some of which are water soluble have had widespread use in machining operations and have been applied to the machine tools and work in a variety of ways including high pressure sprays as disclosed by Ambrose et al. in U.S. Pat. 2,841,554 which issued on July 1, 1958. These lubricating methods, however, have proven inadequate for the machining of modern cobalt, nickel and iron based super alloys as well as the refractory metals such as tungsten and tantalum. The apparent problem which precludes the oil-water combination being acceptable in the machining of super-tough metals is the surface tension of the water. Even with the use of a wetting agent the water is unable to penetrate to the area of contact between the work and tool which lies beneath the chip of work material being removed. Thus high local temperatures are generated, local work hardening of the work material occurs, and early tool breakdown is not prevented.

SUMMARY OF THE INVENTION

The present invention uses a mixture of a coolant and cutting oil to remove frictional heat from the area of contact between the work and tool. The latent heat of vaporization of a relatively volatile coolant provides the heat transfer mechanism by which this heat is removed and a low viscosity oil serves to lubricate the machining operation thus reducing the frictional heat which must be removed. The use of the present invention results in a very significant reduction in the time and expense of machining super-tough metals. Parts may be machined with conventional machine tools at a cutting rate and with tool wear which is comparable to that experienced with common mild steels. Materials which have been described by their manufacturers as virtually unmachinable may now be worked with relative ease by using the method and apparatus of the present invention.

It is thus a primary object of the present invention to provide a new and novel method and apparatus for machining super alloys and refractory metals.

It is another object of the present invention to provide a new and novel method and apparatus for machining super-tough metals wherein special machine tools are not required.

It is a further object of the present invention to provide a new and novel method and apparatus for machining super-tough metals wherein work hardening of said metals is minimized.

It is an additional object of the present invention to provide a new and novel method and apparatus for cooling machine tools and work via the vaporization of a coolant applied to the area of contact between said tool and said work.

The invention accordingly comprises the features of construction, combination of elements and arrangement of parts exemplified in the construction hereinafter set forth and the scope of the invention will be indicated in the claims.

BRIEF DESCRIPTION OF THE DRAWINGS

For a fuller understanding of the nature and objects of the present invention, reference should be had to the following detailed description taken in conjunction with the accompanying drawings in which.

DESCRIPTION OF THE PREFERRED EMBODIMENT

Figure 1:
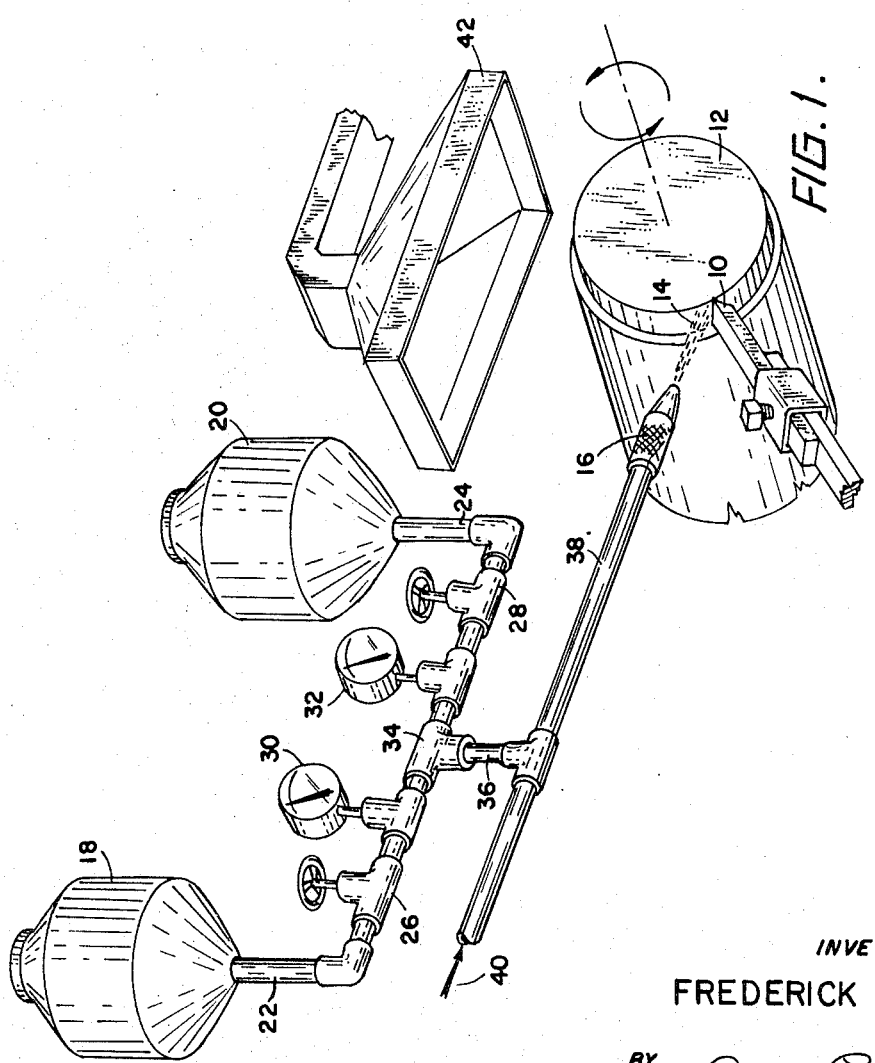
FIG. 1 is a schematic representation of a first embodiment of the present invention.

Referring now to FIG. 1 there is illustrated the first embodiment wherein a body of material to be machined herein termed the work 12 and a machine tool 10 are held in position by a common cutting type machine shop apparatus such as a lathe (not shown) or other equipment familiar to one skilled in the metal working art. In order to remove frictional heat from the area of contact between the work 12 and the tool 10 an aerosol 14 of a volatile coolant and low viscosity lubricant mixture is directed by a nozzle 16 at said area of contact. The aerosol 14 penetrates to the area of contact and removes frictional heat from both the work 12 and tool 10 via the vaporization of the coolant droplets as they come in contact with the heated metals. The coolant and lubricant are supplied from storage means 18 and 20 respectively through supply lines 22 and 24. Each of said supply lines contain flow adjustment means such as valves 26 and 28 and flow indicating means such as meters 30 and 32. The coolant and lubricant are thus supplied to a mixing means 34 in adjustable quantities. After mixing of the coolant and lubricant in a preselected ratio the mixture is fed via an entrainment supply line 36 to a gas supply line 38 where it is entrained in a pressurized gas flow 40 and supplied to the nozzle 16. The gas may be either air, nitrogen or one of the inert gases such as argon. An inert gas would be preferable if an explosive or toxic coolant were used. It will be obvious that a variation of this embodiment of the invention could provide for the entrainment of a lubricant in a pressurized flow of one of the readily available gaseous refriegrants such as ammonia, halogenated hydrocarbons, butane or the like.

The lubricant used in the present invention is preferably of a low viscosity such as a light machine oil, although any animal, vegetable or mineral oil having a substantially similar viscosity will perform adequately. Castor oil and mineral oil are two typical alternative lubricants which are readily available on the commercial market.

The coolant material is specifically chosen to suit specific combinations of work material, tool material, type of working operation, depth of cut, working rate, etc. The significant characteristics of the coolant are its vaporization temperature, latent heat of vaporization, flash point and fire point. The vaporization temperature of the coolant must be no greater than the temperatures generated at the area of contact between the work 12 and tool 10, however, the flash point of the coolant vapors and the fire point of the coolant itself must exceed the frictional temperatures generated. The coolant is selected for the highest latent heat of vaporization within the above described temperature limits. One such coolant which is particularly well suited to and has been used to advantage in the present invention is ethinyl trichloride (1,2,2-trichloroethylene) which has the characteristics listed below.

Chemical composition—$CHCl:CCl_2$.
Vaporization temperature—85.6° C.
Latent heat of vaporization—57.3 calories/gram
Flash point—None
Fire point—Non-inflammable The non-inflammable and non-toxic properties of ethinyl trichloride when considered with its low cost and excellent performance in the present invention make this compound particularly desirable. There is, however, a wide variety of primarily liquid organic compounds which are also applicable to the invention. Depending upon the above-described paramaters of the particular machining operation such specific liquid compounds as carbon disulfide, acetone, chloroform, benzene, toluene, turpentine and naphthalene may be used as coolants in the present invention. Further compounds which may be used include the general classes of organic liquids comprising alcohols, ethers, esters, xylenes and halogenated hydrocarbons. In the event that a particular machining task requires the use of one of the explosive or toxic coolants, which would be entirely feasible with modern computer-operated machine tools, FIG. 1 further illustrates the use of an exhaust hood 42 to reduce the hazard of explosion and/or to remove toxic vapors.

The precise ratio of coolant to lubricant required for optimum performance of the method is dependent upon the particular material to be machined. Some typical examples of mixture ratios which have been successfully used are set forth below.

| Work material | Ethinyl trichloride, percent | Light machine oil, percent |
|---|---|---|
| Cobalt based super alloy | 40-60 | 60-40 |
| Nickel based super alloy | 30-50 | 50-70 |
| Molybdenum | 30-50 | 50-70 |
| Lead | 80-95 | 5-20 |
| Uranium | 5-15 | 85-95 |

In order to provide maximum flexibility in the use of the present invention, individual supply containers 18 and 20 for the coolant and lubricant are shown together with individual flow adjustment valves 26 and 28 and flowmeters 30 and 32. This arrangement of parts provides a single apparatus which is applicable to any combination of machining parameters. It is to be understood that the coolant and lubricant may be pre-mixed in a single supply container and the mixture entrained in a pressurized gas flow or the coolant and lubricant may be entrained in a gas flow at separate points on the gas supply line. Any means which provides for the proper flow of the mixture will be suitable for the practice of the invention.

Figure 2:
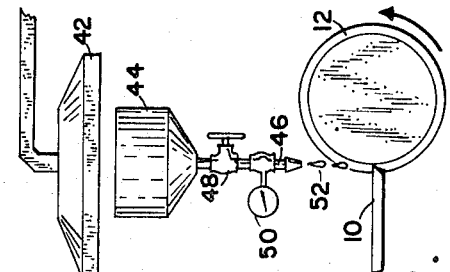
FIG. 2 illustrates an alternative embodiment of the present invention.

The present invention in a more conventional and simplified embodiment is illustrated in FIG. 2. A mixture of coolant and lubricant from a supply container 44 may be dripped in the conventional manner through a supply line 46 which contains a flow adjustment valve 48 and a flowmeter 50. The drops of the mixture 52 fall due to gravity on the point of contact between the work 12 and tool 10 thus removing the frictional heat in the above described manner. A hood 42 is again shown for the removal of the coolant vapors. As with the pressurized embodiment of the invention described above the coolant and lubricant may be either pre-mixed or individually stored.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention therein described, and all statements of the scope of the invention, which, as a matter of language, may be said to fall therebetween.

Having described what is new and novel and desired to secure by Letters Patent, what is claimed is:

1. A method of working super-tough metals with a cutting machine tool, including the step of contacting the metal with a cutting tool, the improvement which comprises the step of applying a mixture of a volatile coolant at ambient temperature and having a surface tension of less than 50 dynes per centimeter and a low viscosity liquid lubricant to the area of contact between said metal and said tool to thereby remove frictional heat from both said metal and said tool through vaporization of said coolant.

2. The method of claim 1 wherein
said super-tough metal is a cobalt based super alloy, and said mixture comprises
40-60 percent by volume of said volatile coolant, and
40-60 percent by volume of said low viscosity lubricant.

3. The method of claim 1 wherein
said super-tough metal is a nickel based super alloy, and said mixture comprises
30-50 percent by volume of said volatile coolant, and
50-70 percent by volume of said low viscosity lubricant.

4. The method of claim 1 wherein
said super-tough metal is a refractory metal, and said mixture comprises 30–50 percent by volume of said volatile coolant, and 50–70 percent by volume of said low viscosity lubricant, 5. The method of claim 1 wherein said super-tough metal is lead, and said mixture comprises 80–95 percent by volume of said volatile coolant, and 5–20 percent by volume of said low viscosity lubricant.

6. The method of claim 1 wherein said super-tough metal is uranium, and said mixture comprises 85–95 percent by volume of said volatile coolant, and 5–15 percent by volume of said low viscosity lubricant.

7. The method of claim 1 wherein said coolant is selected from the group of volatile organic liquids consisting of acetone
benzene
carbon disulfide
carbon tetrachloride
chloroform
naphthalene
toluene, and
turpentine.

8. The method of claim 1 wherein said coolant is selected from the group of organic liquid classes consisting of alcohols
esters
ethers, and
xylenes.

9. The method of claim 1 wherein said coolant is a liquid halogenated hydrocarbon.

10. The method of claim 9 wherein said halogenated hydrocarbon is ethinyl trichloride.

11. The method of claim 1 wherein said lubricant is selected from the group of low viscosity liquid lubricants consisting of mineral oil
lard oil
castor oil
corn oil
cottonseed oil
linseed oil
rape seed oil
soybean oil, and
sperm oil.

12. The method of claim 1 further including the steps of entraining said mixture in a pressurized gas flow, forming an aerosol of said mixture with a nozzle, and directing said aerosol at said area of contact between said metal and said tool.

13. The method of claim 12 wherein said gas is air.

14. The method of claim 12 wherein said gas is nitrogen

15. The method of claim 12 wherein said gas is selected from the group of inert gases consisting of helium
neon
argon
krypton
xenon, and
radon.

16. A method of working super-tough metals with a machine tool, including the step of contacting the metal with a cutting tool, the improvement which comprises the steps of entraining a low viscosity lubricant in a pressurized flow of refrigerant to thereby form a mixture of said lubricant and said refrigerant, forming an aerosol of said mixture with a nozzle, and directing said aerosol at the area of contact between said metal and said tool to thereby remove frictional heat from both said metal and said tool through vaporization of said coolant.

17. The method of claim 16 wherein said lubricant is selected from the group of low viscosity liquid lubricants consisting of mineral oil
lard oil
corn oil
castor oil
cottonseed oil
linseed oil
rape seed oil
soybean oil, and
sperm oil.

18. The method of claim 16 wherein said refrigerant is selected from the group of refrigerants consisting of ammonia
carbon dioxide
sulfur dioxide
ethyl chloride
methyl chloride
butane
propane
ethane
isobutane
nitrous oxide, and
dichlorodifluoromethane.

References Cited

UNITED STATES PATENTS

| | | | |
|---|---|---|---|
| 2,067,676 | 1/1937 | Lees | 29—106X |
| 2,670,528 | 3/1954 | Brunberg | 29—106X |
| 2,848,790 | 8/1958 | McMann | 29—106 |
| 2,851,764 | 9/1958 | White | 29—106 |
| 3,027,625 | 4/1962 | Milstead | 29—105 |

LEONIDAS VLACHOS, Primary Examiner

U.S. Cl. X.R.

29—106; 51—267; 77—55